United States Patent Office 3,255,576
Patented June 14, 1966

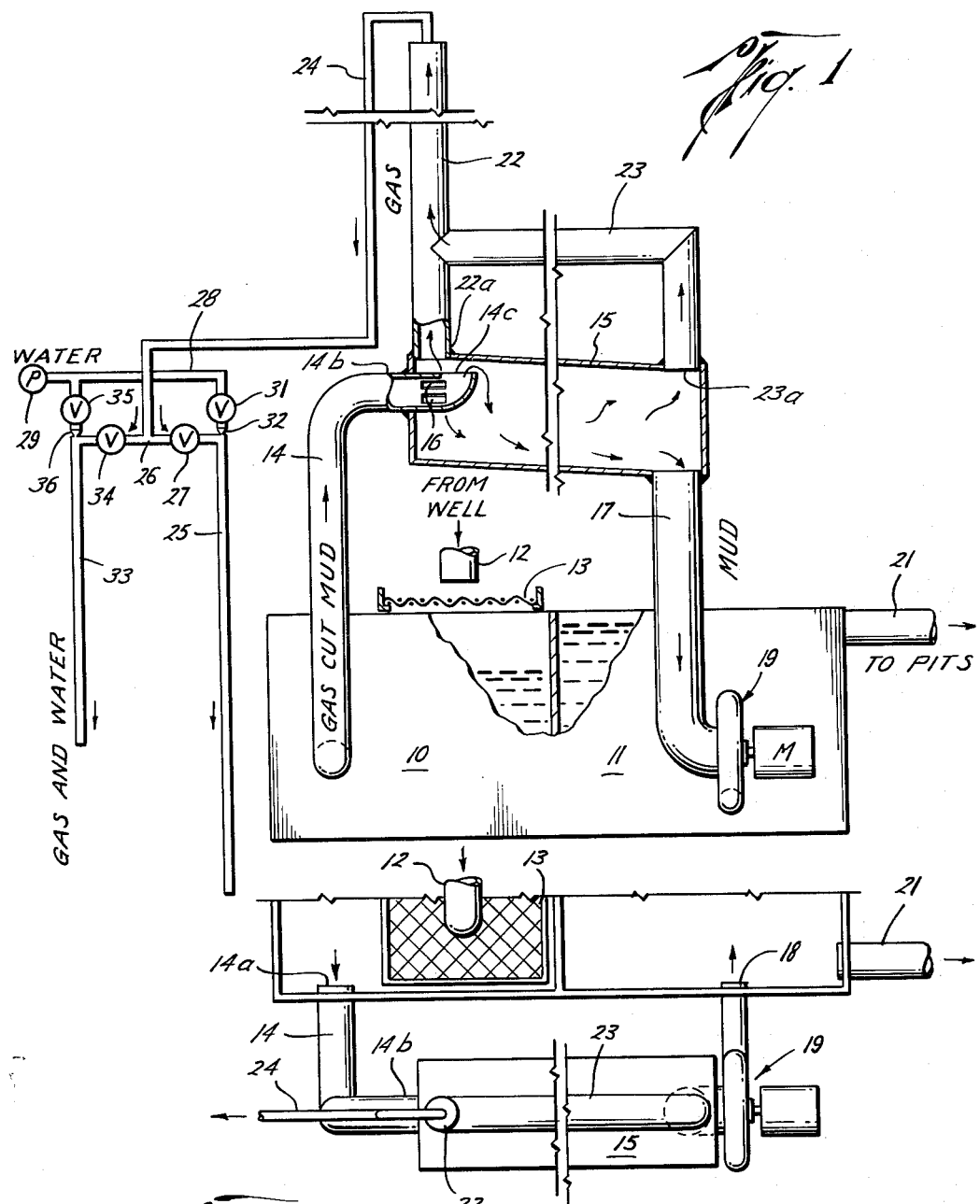

3,255,576
MUD DEGASSER
Billy W. Dawkins, Houma, La., assignor to United Gas Corporation, Shreveport, La., a corporation of Delaware
Continuation of application Ser. No. 154,286, Nov. 22, 1961. This application Oct. 2, 1964, Ser. No. 401,269
2 Claims. (Cl. 55—192)

This application is a continuation of my pending application Serial No. 154,286, filed November 22, 1961, now abandoned.

This invention relates to the degassing of gas-cut mud, and more particularly to an apparatus for removing gas from gas-cut mud.

Mud degassers are well known and have been used in instances where the circulating mud from a well has entrained or dissolved gas therein which reduces the weight of the mud. As the weight of the mud is carefully controlled to in turn control the well being drilled, gas cutting presents a danger of loss of control of the well and the necessity for either removing the gas or adding more weight material to bring the mud back up to the desired weight.

Mud degassers used in the past have employed elaborate baffling in the vacuum chamber to permit release of gas from the mud due to turbulent flow in the presence of a relatively small vacuum. This procedure has been dictated by the lack of an adequate pump for pulling a substantial vacuum on the vacuum chamber. While positive displacement vacuum pumps for pulling substantial vacuums are, of course, known, they are very expensive and economics does not normally permit their use with mud degassers.

It is an object of this invention to provide a mud degasser which operates under a larger vacuum than heretofore possible.

Another object is to provide a mud degasser operating at a greater vacuum than heretofore possible using a very inexpensive pump to pull the vacuum.

Another object is to provide a mud degasser in which an inexpensive centrifugal pump may be used to remove mud from the vacuum chamber.

Another object is to provide a mud degasser which operates at a greater vacuum than heretofore possible and which provides for operation at varying degrees of vacuum to accommodate different mud weights in the same equipment.

Other objects, features and advantages of the invention will be apparent from the specification, the drawing and the claims.

In the drawing, wherein an illustrative embodiment is shown,

FIGURE 1 is a view partially in elevation and partially in section of a mud degasser constructed in accordance with this invention; and, FIGURE 2 is a partial plan view of the degasser shown in FIGURE 1.

The mud degasser includes two mud tanks 10 and 11. Mud tank 10 contains the mud to be treated and mud tank 11 contains the treated mud. If desired, means may be provided to establish flow between the two tanks to provide for partial recirculation of previously treated mud.

Mud from the well is conveyed to tank 10 through conduit 12. Preferably the mud is passed through a screen 13 to remove cuttings therefrom before mud reaches the tank 10. A riser pipe 14 is attached at its lower end 14a to the mud tank 10 and opens into the mud tank at a level below the normal liquid level in tank 10.

Attached to the upper end 14b of the riser 14 is a vacuum chamber 15. Except for the several pipes leading therefrom, the vacuum chamber 15 is totally enclosed so that it may operate at sub-atmospheric pressure. The end 14b of the riser preferably terminates in an upwardly facing opening 14c in which there are positioned baffles 16 to insure turbulence of the mud at the opening 14c.

Within the vacuum chamber 15 the mud passes through a relatively quiescent state as the vacuum chamber 15 is much larger than the riser pipe 14. During this quiescent period additional gas may be released from the mud.

A mud outlet pipe 17 is attached to the vacuum chamber below the normal mud level therein, and preferably in the bottom thereof, and extends downwardly therefrom to the mud chamber 11. The mud outlet pipe 17 has its outlet end 18 provided by the outlet of a pump indicated generally at 19 in mud outlet pipe 17. The outlet 18 of the mud outlet pipe is positioned below the normal liquid level in mud tank 11 so that the pump 19 will be continuously flooded.

The mud tank 11 is provided with an outlet 21 adjacent its upper end which will insure that the mud level in tank 11 is above the outlet 18 so that the pump 19 will always be flooded.

A gas pipe 22 is attached to the vacuum chamber at a point above the normal mud level therein. Preferably the gas pipe is attached at a plurality of points to the top of the vacuum chamber such as at 22a and through branch pipe 23 at 23a. The use of the branch pipe 23 permits the use of a smaller size vacuum chamber.

The gas pipe 22 has a portion 24 of reduced diameter as it proceeds away from the vacuum chamber which is connected to a vacuum pump for drawing a vacuum on the vacuum chamber 15.

The vacuum pump is provided principally by a downwardly extending liquid vacuum pipe 25. This pipe is connected to the gas pipe 24 through a manifold pipe 26 controlled by a valve 27. The lower end of pipe 25 is open to atmosphere and the pipe has a substantial length up to approximately forty feet. The length of the pipe will control the extent of the vacuum present in vacuum chamber 15, and it will be found that the vacuum in the chamber 15 expressed in inches of mercury will be equal to approximately 1 inch of mercury per foot of pipe 25.

In order to provide water for pipe 25 to permit it to function to pull a vacuum in the vacuum chamber, water from any suitable source is provided to manifold 28. If water under pressure is available, such as city water, this may be used; or, if desired, the pressure of city water may be increased, or other water may be delivered to manifold 28 by pump 29. Flow of water to the liquid-vacuum pipe 25 is controlled by a valve 31 in manifold 28.

As an additional means of inducing a vacuum in chamber 15, the outlet from manifold 28 may be provided by a jet 32 which will function to reduce the pressure in manifold 26. The rate at which a vacuum can be drawn in the vacuum chamber 15 will be primarily dependent upon the pressure of the water available and the size of the jet 32. On the other hand, the amount of vacuum which may be drawn will be dependent upon the length of the liquid-vacuum pipe 25.

In some instances it may be desirable to pull a lesser vacuum, and for this purpose the length of pipe 25 may be varied, or, for convenience, a second liquid-vacuum pipe 33 may be provided. This pipe is connected to manifold 26 through a suitable valve 34 and to manifold 28 through a suitable valve 35 and a jet 36.

Operation

When it is desired to use a degasser, mud returning from the well is introduced into mud tank 10. The mud level is above the inlet of riser pipe 14. Tank 11 should be full of mud from the previous use of the apparatus, but if not it may be filled in any desired manner with mud so that the outlet of the mud outlet pipe 17 is completely covered. At this time one of the vacuum pumps is started. For instance, if liquid-vacuum line 25 have a length of 25 feet and it is desired to draw a vacuum in chamber 15 of about 23 to 25 inches of mercury, then valves 27 and 31 will be manipulated to use this pump. On the other hand, if liquid-vacuum pipe 25 have a length of 17 feet, this pump may be used to draw a vacuum of about 15 to 17 inches of mercury in vacuum tank 15. The valve controlling water output from manifold 28 is opened and water passes through the water jet into the liquid-vacuum pipe. In flowing down the liquid-vacuum pipe, the water induces a vacuum in manifold 26 which withdraws the air and gas through gas pipes 24 and 22 from vacuum chamber 15. As the pressure decreases in vacuum chamber 15, mud rises in the mud riser 14 due to atmospheric pressure exerted on the surface of the mud in tank 10. The mud flows up the riser and into the vacuum chamber 15 wherein it continuously gives off its entrained gas. As soon as the chamber has an operative flow of mud therein and the mud outlet pipe 17 is filled, the mud outlet pump 19 is started to begin drawing mud from the vacuum chamber 15 and transferring it into the mud storage tank 11. As the level of mud in tank 11 rises, it passes out through the outlet pipe 21 which is positioned in the nature of an overflow pipe from whence it is transferred to the circulating mud pits.

From the above explanation it will be appreciated that a very inexpensive mud degasser has been provided which is extremely versatile in use. As the only power required to operate the vacuum pump is a simple water pump 29 or a source of water under pressure, it is obvious that an inexpensive water pump can be utilized to draw a much greater vacuum than possible with any positive displacement vacuum pump which could economically be used in this type of service. The system lends itself well to use on land or on water. In fact, over water there is of course a constant supply of salt water which can be delivered to the vacuum pump by the water pump 29 and provide the vacuum at a very low cost. While water is preferred as the liquid for use in the water pump, it is of course obvious that in an arid region a closed system might be employed and, if desired, a liquid other than water used.

Inasmuch as a substantial vacuum can be drawn in the vacuum chamber, the need for extensive baffling within the chamber is done away with. This in turn eliminates the need for manholes into the vacuum chamber and periodic cleaning and replacing of the baffles.

By placing the vacuum chamber above the outlet mud tank and attaching the outlet mud pipe to the tank below its normal liquid level, the mud transfer pump 19 will always be flooded. Also, it will be operating with the aid of the head of mud in outlet line 17, and thus the differential across the mud pump 19 will be held to a minimum value.

As noted above, the primary vacuum results from the movement of liquid down the liquid-vacuum pipe. Thus the jets 32 and 36 could be omitted, but they are desirably employed as they assist in creating the vacuum and they increase the rate at which a vacuum may be induced in the vacuum chamber 15.

The foregoing disclosure and description of the invention is illustrative and explanatory thereof and various changes in the size, shape and materials, as well as in the details of the illustrated construction, may be made without departing in the scope of the appended claims without departing from the spirit of the invention.

What is claimed is:

1. A mud degasser comprising,
   a mud tank,
   a riser pipe extending upwardly from the mud tank and having its lower end open to the interior of the lower section of the tank below a normal mud level therein,
   a closed vacuum chamber attached to the upper end of the riser,
   a mud outlet pipe attached to the vacuum chamber and extending downwardly therefrom,
   a pump in the mud outlet pipe for drawing mud from the vacuum chamber,
   a second mud tank, said outlet pipe opening into the second mud tank below the normal mud level therein,
   a gas pipe having its inlet attached to the upper section of the vacuum chamber above a normal mud level therein,
   a verticallly extending liquid-vacuum pipe having its lower end open to atmosphere and its upper end connected to and extending downwardly from the outlet of said gas pipe,
   and means for introducing flowing liquid into the upper section of the liquid-vacuum pipe for downward discharge and flow therein and keeping said pipe substantially filled with downflowing liquid.

2. A mud degasser comprising,
   a mud tank,
   a riser pipe extending upwardly from the mud tank and having its lower end open to the interior of the lower section of the tank below a normal mud level therein,
   a closed vacuum chamber attached to the upper end of the riser,
   a mud outlet pipe attached to the vacuum chamber and extending downwardly therefrom,
   a pump in the mud outlet pipe for drawing mud from the vacuum chamber,
   a second mud tank, said mud outlet pipe opening into the second mud tank below the normal mud level therein,
   a gas pipe having its inlet attached to the upper section of the vacuum chamber above a normal mud level therein,
   a vertically extending liquid-vacuum pipe having its lower end open to atmosphere and its upper end connected to and extending downwardly from the outlet of said gas pipe,
   a jet attached to the upper section of the liquid-vacuum pipe,
   and means for supplying flowing liquid to the jet for downward discharge and flow in said liquid-vacuum pipe and keeping said pipe substantially filled with downflowing liquid.

References Cited by the Examiner
UNITED STATES PATENTS

| 1,777,817 | 10/1930 | Whittington | 230—105 |
| 2,195,898 | 4/1940 | Newton | 55—190 |
| 2,428,045 | 8/1947 | Sharp et al. | 55—165 |
| 2,748,884 | 6/1956 | Erwin | 55—193 |

FOREIGN PATENTS 809,430  2/1959  Great Britain.

REUBEN FRIEDMAN, *Primary Examiner.*

C. N. HART, *Assistant Examiner.*